March 16, 1948.    O. ZÜLLIG    2,437,903

SPORTS VEHICLE

Filed April 18, 1944

INVENTOR
Otto Züllig
By Bryant & Lowry
attys.

Patented Mar. 16, 1948

2,437,903

UNITED STATES PATENT OFFICE 2,437,903

SPORTS VEHICLE

Otto Züllig, Zurich, Switzerland

Application April 18, 1944, Serial No. 531,627
In Switzerland November 27, 1942

Section 1, Public Law 690, August 8, 1946
Patent expires November 27, 1962

1 Claim. (Cl. 280—8)

The object of the present invention is a sports-vehicle consisting of a toboggan, and wheels upon which this can be mounted. The whole is so designed that the toboggan can be used as such without the wheels and, alternatively, as a sort of sports car with them.

Figure 1:
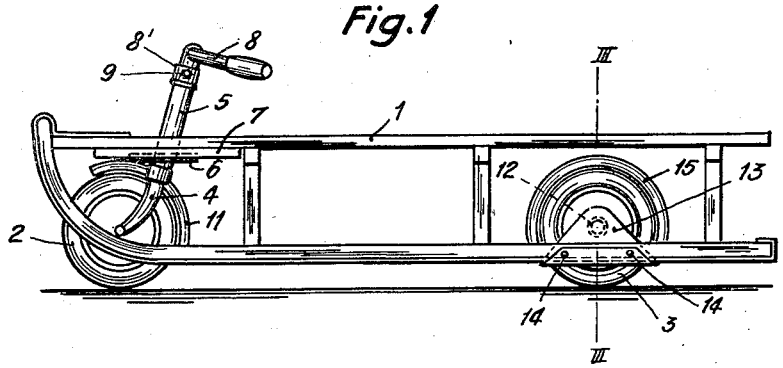
Figure 2:
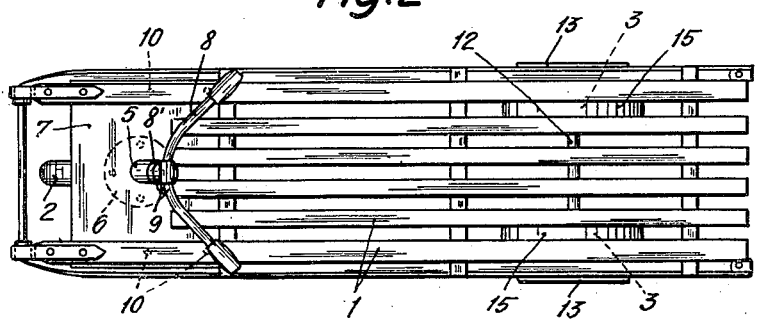
Figure 3:
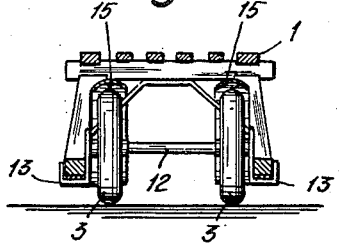

The drawing depicts, by way of example, one specific embodiment of the invention, and upon which, Fig. 1 is a side view of the vehicle, Fig. 2 is a top view of the same, and Fig. 3 is a cross-section along line III—III in Fig. 1.

1 is an ordinary toboggan of the so-called "Davos" type capable of being transformed into a wheeled vehicle by means of a dirigible front wheel 2 and a pair of rear wheels 3. The dirigible front wheel 2 is mounted in a fork 4 similar to that on a bicycle. A shaft rising from the fork 4 is turnably mounted in a tubular sleeve 5 which is affixed by means of a flange 6 to a bearing plate 7. At the upper end of the fork shaft and above the sleeve 5 there are handle bars 8 mounted by means of socket 8' and fastened with a bolt 9. Bearing plate 7 carrying the steering device of the front wheel is affixed from the underside to the longitudinal ribs of toboggan 1 by means of screws 10. 11 is the mudguard of the front wheel.

The rear pair of wheels 3 is turnably mounted on an axle 12 which is provided with a bearing plate 13 at each of its ends. The runners of the toboggan are fastened in the bearing plates 13 by screws 14. 15 are the mudguards of rear wheels 3 and are also affixed to the bearing plates 13.

As a dirigible wheeled vehicle the object of the invention can be used in summer on existing bob runs, the rubber tired wheels 3, 2 making the downrun as smooth and rapid as with a bicycle.

The sports vehicle described being characterised by its low design, there is much les danger of dangerous falls during rapid descents than in the case of the bicycle. The vehicle is thus admirably suitable for children's use.

The wheels are removed by loosening screws 10 and 14, whereupon, within a few minutes, the wheeled vehicle can be transformed into a toboggan.

The chassis may be constructed of wood, iron or steel tubing; fitted with wheels it can be used in summer as a sports car, and in winter without wheels as a toboggan for winter sports. The most suitable type of construction if the vehicle is to be used all the year round is that with steel tubing.

The object of the invention herein described is an independent, dirigible vehicle for young and old, for use on the way to and from school, for sport and games. When the wheels are removed the resulting toboggan can be used as such for ascents and descents. As a wheeled car it is also particularly suitable for the conveyance of goods and persons in the service of hotels and such-like establishments, the army, Red Cross work, etc. Furthermore it is adaptable as a bicycle trailer.

Owing to its small size the sports vehicle can be kept anywhere in the house, and is easy to transport by train or tram. In consequence of its low design children may sit on it without danger. By affixing cords or straps to the sports car, the latter can easily be carried on the back. When running, the vehicle can quickly be stopped by the user's standing up and lifting it. Skiers will also find it useful on their return from a summer tour as a conveyance from the lower snow limit to the nearest railway. Furthermore, it forms a useful small car in military and Red Cross work, e. g. for the transport of supplies and ammunition in places inaccessible to other cars. When taken along on tours and excursions it forms a serviceable seat.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claim.

Having thus described my invention, I claim as new and desire to secure by Letters Patent:

A sports vehicle comprising a toboggan having an upper platform and lower side runners, a dirigible front wheel detachably mounted on the upper platform and a pair of rear wheels detachably mounted on the lower side runners, all of said wheels being disposed between the side runners, the mounting for the rear wheels including bearing plates having channel portions at their lower ends embracing the side runners and a cross axle for the wheels mounted in the upper ends of said bearing plate.

OTTO ZÜLLIG.

(References on following page)

REFERENCES CITED

The following references are of record in the file of this patent:

UNITED STATES PATENTS

| Number | Name | Date |
|---|---|---|
| 390,632 | Waite et al. | Oct. 2, 1888 |
| 627,001 | Lahm | June 13, 1899 |
| 1,212,277 | Stephany et al. | Jan. 16, 1917 |
| 1,401,640 | Porter | Dec. 27, 1921 |
| 1,485,834 | Davis | Mar. 4, 1924 |
| 1,574,829 | Lystad | Mar. 2, 1926 |
| 1,681,853 | Hance | Aug. 21, 1928 |
| 2,157,461 | Robinson | May 9, 1939 |

FOREIGN PATENTS

| Number | Country | Date |
|---|---|---|
| 48,478 | Austria | June 10, 1911 |
| 56,454 | Switzerland | Apr. 28, 1911 |